_United States Patent_ [19]

Hager

[11] 4,215,040

[45] Jul. 29, 1980

[54] DENSITY SEPARATION PROCESS

[75] Inventor: Douglas F. Hager, Fairfield, Ohio

[73] Assignee: The Procter & Gamble Company, Cincinnati, Ohio

[21] Appl. No.: 972,631

[22] Filed: Dec. 22, 1978

[51] Int. Cl.$^2$ .............................................. A23J 1/14
[52] U.S. Cl. ................................. 260/123.5; 426/656
[58] Field of Search ....................... 426/656, 481, 489; 260/123.5, 112 R

[56] References Cited

U.S. PATENT DOCUMENTS

| | | | |
|---|---|---|---|
| 3,450,688 | 6/1969 | Melnychyn | 260/123.5 |
| 3,520,868 | 7/1970 | Henderson et al. | 260/123.5 |
| 3,762,929 | 10/1973 | DeLapp | 426/656 |
| 3,828,017 | 8/1974 | Finley et al. | 426/656 X |
| 3,842,062 | 10/1974 | Eastman | 426/656 X |
| 3,869,438 | 3/1975 | Finley et al. | 260/123.5 |
| 3,952,115 | 4/1976 | Damico et al. | 426/656 X |
| 4,072,671 | 2/1978 | Sodini | 260/123.5 |

_Primary Examiner_—Robert A. Yoncoskie
_Attorney, Agent, or Firm_—Jerry J. Yetter; Jack D. Schaeffer; Richard C. Witte

[57] ABSTRACT

A density separation process for recovering vegetable seed protein granules from the remaining portion of the vegetable seeds, using an aqueous single-phase solution of an organic acid salt, said aqueous solution having a density of from about 1.2 to about 1.45 g/ml and a water activity of from about 0.40 to about 0.85.

14 Claims, No Drawings

DENSITY SEPARATION PROCESS

TECHNICAL FIELD

Many types of vegetable seeds contain protein of sufficient quality and concentration to be nutritionally useful for humans. Unfortunately, because the vegetable seeds are often in a form unacceptable to human tastes, their valuable protein material is not conveniently used. Soybean seeds, for example, not only have high concentrations of protein and a high protein efficiency ratio, they also have seed flavor notes which are unacceptable to many humans as well as other seed materials which tend to induce flatulence. It can be appreciated that there is a continuing need for commercially feasible processes to separate the edible protein present in vegetable seeds from the undesirable and inedible materials. Successful protein separation techniques allow direct human consumption of vegetable protein found in previously unpalatable sources, for example, the protein-rich residues which are left after the oil is extracted from oleaginous seeds such as soybeans.

The walls and cells of desirable vegetable seed sources of protein consist primarily of lipid, insoluble cellulosic materials, soluble carbohydrates, etc. In such vegetable seed protein sources, the majority of the protein is present in the form of discrete granules. Accordingly, the protein granules need to be released from the balance of the seed structure to be used, for example, in the manufacture of vegetable-based meat analog products, and the like.

The protein of vegetable seeds, especially oleaginous seeds such as soybeans, peanuts, sunflower seeds, and cottonseeds, is usually obtained in the form of an isolate or concentrate. The vegetable seeds are first comminuted or ground to form flakes, meals, or flours, which are either extracted with a solvent, e.g., hexane, or pressed to remove the oil and lipid materials. In past practice this defatted mass is then treated to produce either an isolate or a concentrate by separating the protein from the residual cellular components.

The defatted mass can be washed with an alcohol/water solution to dissolve and remove residual nonproteinaceous material and yield a concentrate. Concentrates, however, generally have relatively low (ca. 70%) protein contents.

Traditional protein extraction processes for producing isolates from the defatted mass use aqueous alkaline solutions or water to solubilize the protein. The solubilized protein can then be removed from the insoluble seed materials and precipitated and recovered by various means; isoelectric precipitation, for example.

There are many inherent disadvantages in the artdisclosed protein extraction procedures. Some separation methods yield products of relatively low protein content. The tendency to denature protein by the excessive heat or harsh pH's used in other processes detrimentally affects the physical-chemical characteristics of the protein. The denatured proteins recovered from such processes are difficult to use in certain commercial applications and appear to have a low protein efficiency ratio (PER) when used in a food product. Some separation methods use flammable solvent systems. Still other methods use halogenated organic solvents, which may be undesirable where the ultimate product is to be consumed by humans.

As noted, many types of vegetable seeds, especially oleaginous seeds such as soybeans and cottonseeds, contain their protein in the form of discrete particles. The present invention provides a means for conveniently separating such protein particles from vegetable seeds by means of a density separation process. In this process, an aqueous solvent system having specified physical-chemical characteristics and comprising water and a toxicologically acceptable organic acid salt is used to separate the protein particles from the other cellular components.

Using this binary system, the protein granules are recovered substantially intact, even though the solution is aqueous and would be expected to rupture the granules. Additionally, the separation solutions are easily recyclable for use in commercial operations and, importantly, the protein which is recovered has a PER approximately equal to ground beef (ca, 3.0) when supplemented with N-acyl-methionine, as compared with a PER of only about 2.5 for some denatured commercial isolates supplemented with methionine.

The protein products made by the process of this invention are suitable for use as foods by humans and lower animals, and are especially useful in the manufacture of "texturized proteins," e.g., meat analogs, and the like, using art-disclosed protein texturization processes.

BACKGROUND ART

Mikola, et al., Plant and Cell Physiology 16, 933–937 (1957) disclose the sensitivity of the aleurone grains of oilseeds such as cottonseeds and peanuts to aqueous media.

U.S. Pat. No. 3,794,735, Newsom, et al., Feb. 26, 1974 discloses a method for isolating protein from protein bearing seeds without removing the lipid (defatting). An aqueous emulsion of protein and water is formed and centrifuged to remove cellulosic materials. The protein is recovered by isoelectric precipitation. R. D. Hagenmaier, *J. Am. Oil Chem. Soc;* 51, 470 (1974) discloses the preparation of sunflower seed isolate from full fat seeds by solubilization and extraction followed by isoelectric precipitation and centrifugation.

M. P. Tombs, *Plant Physiology*, 42, 797 (1967) describes a method of isolating protein bodies from soy meal by density gradient centrifugation using a 70% to 90% (wt/vol) aqueous sucrose solution having a density from 1.25 to about 1.34. The reference also describes the swelling and bursting of protein bodies when the meal is placed in contact with water, a problem which is said to be solved by buffering at pH 5, the isoelectric point of soy protein (glycinin).

K. Saio, D. Gallant, and L. Pettit, *Cereal Chemistry*, 54, 1171, (1977) disclose a method for recovering protein bodies from sunflower seeds. Defatted meal is suspended in a 20% sucrose solution buffered to pH 5 with citrate, sonicated, filtered through gauze, density fractionated in 70%–90% sucrose solution or in a 30%–90% sucrose gradient solution.

Certain other density fractionation-type processes for separating protein from other cellular materials are known. K. Saio and T. Watanabe, *Agr. Biol. Chem.*, 30, 1133 (1966) disclose the recovery of protein bodies from soybeans by centrifugation in a cottonseed oil-carbon tetrachloride mixture after homogenizing milled seeds in the cottonseed oil. U.S. Pat. No. 3,828,017, Finely, et al. (1974) discloses the centrifugation of a slurry of pulverized soy material and liquid fluorocarbon having a density of 1.35 to 1.45. J. W. Finley, *J. Food Sci.*, 41 882 (1976) discloses the use of chloro- and fluorocarbons in the density separation of protein from wheat flour. Systems such as Freon-11 with ethanol, acetone, hexane and ethyl acetate, and benzene with carbon tetrachloride are disclosed.

U.S. Pat. No. 3,365,440, Circle, et al., Jan. 23, 1968 discloses a process for leaching water soluble protein from soybeans through a countercurrent extraction with an aqueous solution buffered at the isoelectric point of soy protein which is alkali-soluble and acid-precipitable. The residue can be extracted with alkaline solution and acidified to recover an isolate.

U.S. Pat. No. 3,630,753, Melnchyn, Dec. 28, 1971 relates to the treatment of alkaline slurries of soy isolate to reduce viscosity.

Other methods for isolating protein have involved extraction of protein by solubilization in mixtures of polar and nonpolar solvents and dissolution followed by reprecipitation of protein. U.S. Pat. No. 2,278,670, Rauer, Apr. 7, 1942, discloses a two-step process for recovering protein using organic solvents and alkali.

U.S. Pat. No. 3,043,826, Beaber, et al., July 10, 1962 discloses the extraction of protein from alcoholtreated soybean material by contact with water at alkaline or acidic pH's and with subsequent recovery by precipitation.

Japanese Pat. No. 2,130,942, Ajinomoto, Apr. 22, 1976 (abstract) discloses the separation of protein material by isoelectric precipitation.

U.S. Pat. No. 4,072,671, Sodini, et al., Feb. 7, 1978 relates to the extraction of phenols and oligosaccharides from vegetable materials using a polar organic solvent, especially n-butanol, combined with an aqueous solution of an acidic electrolyte, especially hydrochloric acid.

Other separation procedures are also known. U.S. Pat. No. 3,734,901, Hayes, et al., May 22, 1973 discloses a protein concentration step in which nonproteinaceous materials are separated from vegetable seed material using a monohydric alcohol/water extraction medium. U.S. Pat. No. 3,649,293, Hoer, et al., Mar. 14, 1972 teaches the separation of protein by solubilizing the protein, deposition the protein on solid cellular material, and separating the protein-carrying solids, which are processed further.

Still other procedures involve the use of aqueous polyelectrolyte solutions, e.g. carboxymethylcellulose, carrageenan, guar gum, and sodium alginate to obtain concentrates, U.S. Pat. No. 3,762,929, Delapp, Oct. 2, 1973; to improve the water solubility of globulins, U.S. Pat. No. 3,407,076, Ganz, Oct. 22, 1968; to recover solubilized protein from whey, U.S. Pat. No. 3,069,327, Eldridge, et al., Dec. 18, 1962 and U.S. Pat. No. 3,792,175, Schmidt, Feb. 12, 1974; and to prepare water soluble complexes of water dispersible protein, U.S. Pat. No. 3,842,062, Eastman, Oct. 15, 1977.

DISCLOSURE OF THE INVENTION

The present invention encompasses a process for recovering vegetable seed protein granules from vegetable seed material, comprising suspending comminuted vegetable seed material in an aqueous solution of a toxicologically acceptable alkali metal, calcium, or magnesium salt of an organic carboxylic acid, said solution having a density of from about 1.20 to about 1.45 and a water activity of from about 0.40 to about 0.85, and isolating the vegetable seed protein granules from the balance of the vegetable seed material.

The present invention also encompasses a process for recovering vegetable seed protein granules from vegetable seed material (Preferably containing from 0% to about 5% lipid), comprising:
(1) washing comminuted vegetable seed material with an alcohol water mixture containing from about 50 to about 90 parts of alcohol by weight;
(2) separating said material from the alcohol/water mixture;
(3) suspending said comminuted vegetable seed material in an aqueous solution of a toxicologically acceptable alkali metal, calcium, or magnesium salt of an organic carboxylic acid, said solution having a density of from about 1.20 to about 1.45, and a water activity of from about 0.40 to about 0.85; and
(4) isolating the vegetable seed protein granules from the balance of the seed materials.

The present invention takes advantage of the fact that the difference in density between slightly hydrated protein granules and the residual cellular material of ground vegetable seed material can be used as a basis for a density fractionation process. Through the careful control of the density, water activity, and viscosity of the binary aqueous organic acid salt solution, separations can be made with ease and without hydrating and adversely denaturing the protein granules or proteins contained therein. The product is a vegetable protein having superior physical characteristics for commercial formulation, e.g., in meat analog type products, as well as superior protein quality.

By "vegetable seed protein granules" and "protein granules" as used herein is meant aleurone grains or protein bodies. Aleurone grains and protein bodies are granules of reserve or storage protein and are typically found in the seeds of many species of plants. Such reserve or storage proteins differ in their physical and chemical properties from proteins typically found in generalized cell protoplasm. Such subcellular granules or organelles contain most of the protein material, for example, in soybeans. Protein bodies and aleurone granules range in diameter from $0.1\mu$ in the high lysine corn mutant "opaque-2," to about $20\mu$ in soybeans; a typical size range is from 2 to $8\mu$.

By "vegetable seed material" as used herein is meant plant seeds which contain protein granules. Among the vegetable seed materials known to contain protein granules are cereal grains including rice, oats, barley, millet, corn, grain sorghum, and immature wheat (in mature wheat the granules fuse together). Other vegetable seed materials which can be used herein include various non-oleaginous legumes such as peas, broad beans, jack beans, lima beans, mung beans, and lentils, all of which are reported as having protein granules.

The preferred class of vegetable seed materials used herein encompasses the "oleaginous seeds." By "oleaginous seeds" is meant such oil- and protein granule-containing seeds as cottonseeds, soybeans, peanuts, rapeseed, copra, sunflower seeds, and the like. The most preferred vegetable seed material is the seed of the soybean. The oleaginous seeds have preferably been defatted—most of the lipid has been removed so the lipid content is in the range of 0% to 5%.

By "alkali metal, calcium, or magnesium salt" as used herein is meant the salt formed, typically, by the neutralization of an organic carboxylic acid by an alkali metal hydroxide, or by calcium or magnesium hydroxide. The metal cation must be selected so that an aqueous solution of the salt formed with the organic carboxylic acid can be prepared having the required density as well as the required water activity. Alkali metals are preferred and the preferred alkali metals are potassium, rubidium and cesium; the most preferred is potassium.

By "organic carboxylic acid" as used herein is meant a compound of the formula

wherein R is hydrogen or a $C_1$-$C_{20}$ organic substituent which can be saturated or unsaturated and can be substituted, especially with hydroxyl or additional carboxy groups, or unsubstituted. Any carboxylic acid which forms an alkali metal, calcium, or magnesium salt having an aqueous solution within the water activity and density limits defined herein is acceptable for use. Typical acids have less than about six carbon atoms; longer chain acids are, in general, less soluble in water and so are less suitable for achieving the required density. Typical acids used herein (in the salt form) include formic, fumaric, maleic, gluconic, succinic, isobutyric, oxalic, picric, and propionic acid. Preferred acids include citric, lactic, acetic, and maleic acid, as well as dimers of glycolic acid. The most preferred acids are glycolic and tartaric acids.

The carboxylic acid salts most preferred for use herein are potassium glycolate and dipotassium tartrate (potassium hydrogen tartrate is not soluble enough in aqueous solution to provide the required density). It can be appreciated that among salts producing aqueous solutions of the required density and water activity, those approved for food or feed use are especially preferred.

The term "water activity" ($a_w$) is used herein in its usual context to mean the ratio of the fugacity of water in a solution (f) to that of pure water ($f_o$) at the same temperature. The water activity of a solution can be conveniently measured on a Sina Hygrometer, Type SMT-B, which provides a direct determination of $a_w$. The water activity of an ideal aqueous solution is 0.9823 for a one molal solution. However, as the concentration of electrolytes, such as salts, increases, their aqueous solutions depart significantly from ideal behavior.

By "separating" as used herein is meant the recovery of solid material from a mixture. A typical separation procedure used herein is filtration.

By "isolating" as used herein is meant a procedure by which the protein granules can be separated from the residual vegetable seed material. This step is usually accomplished by using centrifugation to perform a density fractionation followed by a physical separation and removal of the protein granule layer from the remainder of the density fractionated mixture. The isolation step can be performed using high or low centrifuge velocities and can even be accomplished by letting the suspension of comminuted seed material fractionate by the force of gravity. Centrifugation is the preferred mode for density fractionation and useful centrifuge forces for this purpose are typically in the range of 1,700 g to 17,000 g.

By "comprising" is meant that other materials may be present in the separation solutions and other processing steps can take place so long as they do not adversely affect either the vegetable material or the required physical chemical characteristics of the solutions used for the density fractionation. Thus, the term "comprising" encompasses the more restrictive terms "consisting essentially of" and "consisting of."

Composition percentages used herein are weight/weight.

To achieve an efficient separation of the protein granules from the other components of the vegetable seed material during the density fractionation process, the vegetable seed material must be finely ground or comminuted. The grinding or comminution frees as many of the protein granules as possible from the cellular structure of the seeds. Especially where oleaginous seeds are used, this grinding is more easily accomplished if the seed material is defatted to a lipid concentration of less than about 5% before grinding. However, oleaginous seeds can first be flaked or ground and then defatted for use in the present process, or, they need not be defatted at all.

Any conventional method of defatting oleaginous seeds can be used. In most conventional defatting processes, the oleaginous seed is first roll milled or comminuted to form thin flakes or meal. This exposes a greater surface area and accelerates the defatting process. The flakes or meal are then either pressed to remove the oil and lipid materials, or extracted with a solvent such as hexane. The solvent is then removed by methods such as air drying to produce low lipid content oleaginous seed flakes, meal, or flour.

Any conventional mode of grinding can be used to reduce the particle size of the low lipid content vegetable material. The following methods are examples of acceptable grinding methods, jet milling, pin milling, hammer milling, ball milling, or vibrational energy milling. Jet milling is especially efficient in reducing the particle size of the seed material. Where lipid-containing seed materials are used, undefatted soybeans for example, the preferred modes of grinding are hammer milling after freezing the seeds with dry ice or milling with a colloid mill after adding excess lipid, up to about 70% total lipid, to the seeds.

The particle size of the ground seed material should be in the range of about 20 to about 150 microns. The particle size can be less than about 20 microns. However, as the particle size is reduced, the protein granules may also become comminuted with a resulting increase in protein loss from solubilization. Preferably, at least 90% (by weight) will be less than 80 microns to promote an efficient separation and release of the protein granules from other cellular material by the present process.

The preferred method of this invention uses defatted soybean flakes, meal or concentrate with a lipid content of 0% to about 5% and which have been milled to a particle size of about 30 to about 80 microns.

When the comminuted seed material is added to the separation solution comprising water and the alkali metal, calcium, or magnesium salt of the organic carboxylic acid and having the specified density and water activity, the salt controls both the density and the water activity of the separation solution. The density range, expressed in gram/ml, for the binary fractionation solutions of the present invention is from about 1.2 to 1.45, with a preferred range of about 1.3 to about 1.40. When operating in this range, the protein granules are easily separated from both the aqueous solution and the more dense, insoluble residual vegetable seed materials such as cellulose and other insoluble carbohydrate materials present in the starting vegetable material. Density can be conveniently be measured using standard techniques, e.g., using a pynconometer.

In the binary separation solution, the carboxylate salt also performs the crucial function of controlling the water activity of the solution, thereby greatly facilitating the separation. Applicant has discovered that water activity outside the desired range can detrimentally affect protein separations involving vegetable seed material and aqueous solutions in either of two ways. Unless the water activity of the separation solution is kept lower than about 0.85, preferably below about 0.80, both the protein granules and the seed residues hydrate and swell, and, as a result, the densities of the protein granules and the seed residues decrease and approach one another. If excessive hydration is allowed to occur and the densities of all materials in the separation solution become too close, a separation based on density will be difficult to achieve. By maintaining the water activity below the specified upper limit, hydration is reduced, the density difference between the protein granules and the seed residue is maintained, and separation can be achieved to yield high quality protein.

On the other hand, unless the water activity in the binary solutions is kept above about 0.40, preferably above about 0.55, the protein granules are substantially unhydrated with an increased density too close to that of the residual cellular material for an efficient separation. Thus, unless at least some (carefully controlled) hydration of the protein granules occurs, a separation based on density differences is difficult to achieve, simply because the density of all the materials suspended in the separation solution will be similar.

The use of separation solutions having the density described above and a water activity in the range of from about 0.40 to about 0.85, and preferably from about 0.55 to about 0.80, allows an efficient separation of protein granules from residual cellular material.

Still another benefit of the low water activity required for the separation is the inhibition of bacterial growth; something of an antimicrobial effect is achieved.

Potassium glycolate has a water activity of 0.49 at saturation (59.8% w/w in water, density 1.383 g/ml). Dipotassium tartrate has an $a_w$ of 0.73 at saturation (66.7% w/w in water, density 1.485 g/ml); of 0.829 in 50% solution (density 1.40 g/ml), and of 0.863 in 45% aqueous solution (density 1.352 g/ml). Potassium acetate at saturation, 66.7%, and in 65% solution has $a_w$'s of 0.259 and 0.340 respectively. At 60% aqueous solution KAc has an $a_w$ of 0.408 and density of 1.337; at 50% $a_w=0.561$ and the density is 1.276; in 40% solution the $a_w$ is 0.702, the density is 1.216. In 25% KAc solution, $a_w=0.765$, however the density is 1.18 g/ml. Accordingly, these materials are especially useful in practicing the present invention.

Food or feed-approved antibacterial, anti-fungal, and antioxidant agents can optionally be added to the aqueous solutions of organic acid salt without deleterious effect. Such additives are preferred when the density fractionation process is operated at or above room temperature for several hours.

Although the binary separation solutions maintain a relatively low density even when recycled, after use the solution may become inconveniently viscous, either from the suspended comminuted vegetable seed material, from dissolution of the sugars naturally present in the vegetable seed material or from solubilized protein. For ease in handling the solution, it is preferred to maintain a viscosity of from about 1 centipose to about 300 centipoise; a viscosity of from about 1 centipoise to about 100 centipoise is most preferred.

In a typical procedure the comminuted seed matter is suspended through intimate mixing with the aqueous salt solution. Any conventional mode of mixing can be used. High shear mixing is preferred, but simple stirring is also an acceptable mode.

A vegetable seed material to solution ratio of about 1:4 to about 1:100 (parts by weight) is acceptable for use in this process. Preferred for use herein is a defatted, comminuted oleaginous seed:solution ratio of about 1:5 to about 1:20 (parts by weight).

The contact time between the separation solution and the protein granules, as well as the temperature, affects the yield and the amount of protein recovered.

Generally, from about 5 minutes to 15 hours of mixing time is sufficient. The time of mixing is dependent both upon the temperature of the solution and the type of mixing used. About 1–2 hours of mixing using simple magnetic stirring at 25° C. is adequate. High shear mixing using a higher temperature, 50° C. for example, requires less time.

The temperature at which the mixing occurs and at which the density fractionation is accomplished can be as low as about 0° C., so long as the solution is liquid, to about 100° C., preferably from about 15° C. to about 50° C. In general, the higher the temperature, the less viscous the solution and thus the easier to handle. However, as the temperature is increased above 50° C., the carbohydrates present in the seed can begin to gel, the rate of denaturation of the protein increases, and there is an increase in the rate of hydration of the protein granules as well. As the temperature decreases below 15° C., the salt becomes less soluble and it becomes more difficult to maintain the required water activity and density.

After mixing, the vegetable seed material/separation solution mixture is density fractionated. If an oil-containing seed material is used, a top layer comprising lipid is formed. The remaining layers are the same whether lipid containing or defatted vegetable seed materials are used. The next layer contains 60% to 90% of the protein (as granules) present in the starting vegetable material. The middle layer consists of separation solution which also contains water-soluble salts and sugars present in the vegetable seed material and a minor amount of protein. The bottom layer is primarily composed of the insoluble cellulosic and insoluble carbohydrate materials that make up the seed walls and other portions of the seed; however, a minor amount of protein may also be present.

The protein granule-containing layer is separated from the remaining layers by conventional methods such as decantation, filtration, etc. The protein recovery is typically 60–90% of the protein present in the original vegetable seed material. The remaining protein is found either in the middle solvent layer or is still associated with the insoluble carbohydrates. The fractionation solution can be recycled.

In a preferred mode, the present invention also encompasses a process which comprises suspending comminuted, defatted oleaginous seed material with the aqueous solution as described; isolating the protein granules from the vegetable seed residue as described; defatting the protein granules, where the starting material contains more than about 5% lipid; and as a final, optional step, a concentration/extraction treatment which selectively extracts non-proteinaceous components from the protein granules and further concentrates the protein.

For example, an extraction of the protein granules isolated by centrifugation and separation with one of the following water-alcohol systems can provide concentrated oleaginous seed protein. This extra solvent extraction step further concentrates the separated protein by dissolving and carrying away any residual non-proteinaceous components, principally extraneous vegetable carbohydrates.

The alcohols suitable for practicing the optional extraction/concentration step include the lower low molecular weight alcohols, such as methanol, ethanol, 1-propanol, 2-propanol, and the butanols. The most preferred alcohol is ethanol, for both organoleptic and safety reasons.

The preferred water-ethanol extraction solvent comprises from about 50 parts by weight to about 90 parts by weight alcohol, the balance being water. The most preferred water-alcohol system is from about 50 parts to about 70 parts ethanol and from about 30 to about 50 parts water (by weight).

The optional concentration/extraction step can be conducted in a temperature range from about 20° C. to about 60° C.; from about 20° C. to about 30° C. is preferred.

Whether or not the optional concentration/extraction step is performed, final desolventizing (drying) of the oleaginous protein material is not critical and can be achieved by conventional means such as free draining or centrifugation followed by force air drying, filtration followed by drying, etc. The preferred methods are forced air drying of drained flakes at a temperature of from about 40° C. to about 90° C. and steam desolventizing.

Another preferred mode of practicing the present invention encompasses a process for separating vegetable seed protein granules from vegetable seed materials containing from 0% to about 5% lipid, comprising: (1) prewashing comminuted vegetable seed material with an alcohol/water mixture containing from about 50 to about 90 parts of alcohol by weight; (2) separating the vegetable material from the alcohol/water mixture; (3) suspending the vegetable material in an aqueous solution of a toxicologically acceptable alkali metal, calcium, or magnesium salt of an organic carboxylic acid, said solution having a density of from about 1.20 to about 1.45 g/ml and a water activity of from about 0.4 to about 0.85; and (4) isolating the vegetable seed protein granules from the balance of the seed materials. The processing conditions and solutions for step (1), the washing step, are the same as for the optional concentration/extraction step described above.

This processing mode is especially preferred where the separation solution is to be recycled. The use of the salts and the water activity/density ranges described herein minimize the solubilization of the protein granules. However, because the separation solution is aqueous, some of the sugars naturally present in the vegetable seed materials dissolve, thereby increasing both the viscosity of the solution as well as the solubilization of the protein granules. It appears that once some sugar has dissolved into the binary separation solution, the tendency to solubilize protein is enhanced leading to synergistic viscosity increases as well as increased protein solubilization. Both of these effects are undesirable where the separation solution is to be recycled since viscosity increases make handling more difficult and increased protein solubilization reduces yields. By prewashing the comminuted vegetable material with an alcohol/water solution before the density fractionation steps, the sugar content of the vegetable material is reduced and the viscosity and amount of protein solubilization remain low for many recycles of the separation solution.

BEST MODE OF CARRYING OUT THE INVENTION

EXAMPLE I

| Liquid System | Parts by Weight |
|---|---|
| Potassium glycolate | 54.5 |
| Water | 45.5 |

The binary separation solution of potassium glycolate and water has the density of 1.35 g/ml, a viscosity of about 7 cp, and an $a_w$ of 0.57. Defatted soy flour having a particle size of between 20 and 100 microns was mixed with the liquid solution at a ratio of 12 parts separation solution to 1 part soy to form a slurry which was introduced into a Sharples P-3400 decanter type centrifuge. The centrifuge was operated at 3000 g and room temperature. The slurry was introduced at a flow rate of from 139 to 145 pounds/min. with a Δ rpm between conveyer screw and centrigue bowl of from 8 to 14 rpm.

The liquids discharge, which contained the suspended protein granules was collected. The density was lowered to about 1.30 g/ml by the addition of 0.10 lbs. of water per pound of liquid in order to cause the protein granules to sink. This mixture was then recentrifuged, the protein obtained and washed with 40% water/60% ethanol at 20° C. to remove residual soluble sugar components and potassium glycolate and then air dried.

Typical results are shown by the following table with samples being taken for analysis at the indicated times.

| | Feed Stream | |
|---|---|---|
| Time (min) | ΔRPM | Slurry Flow (lb/min) |
| 6 | 8 | 144 |
| 11 | 10 | 145 |
| 17 | 14 | 140 |
| 22 | 12 | 139 |

| | Liquids | | |
|---|---|---|---|
| Time (min) | Flow out (lb/min) | % Protein in recovered sample | % Yield |
| 6 | 131 | 86 | 54 |
| 11 | 128 | 87.3 | 81 |
| 17 | 126 | 88.0 | 85 |
| 22 | 126 | 87.9 | 87 |

| | Solids | | |
|---|---|---|---|
| Time (min) | Flow out (lb/min) | % Protein in recovered sample | % Yield |
| 6 | 12 | 31.0 6 | |
| 11 | 18 | 38.8 | 9 |
| 17 | 16 | 31.4 | 7 |
| 22 | 15 | 30.7 | 7 |

When the defatted soybean flour is replaced by a defatted soybean meal or defatted soybean concentrate, similar results are obtained.

When the defatted soybean flour is replaced by defatted peanut flour, defatted cottonseed meal, or defatted peanut concentrate, similar results are obtained.

Dimers of glycolic acid can be used in place of glycolic acid to achieve similar separations.

When the density separated soy protein is supplemented with a nutritionally supplemental amount of N-acetyl-L-methionine or its derivatives, in the manner disclosed in U.S. Pat. Nos. 3,878,305 and 3,952,115, incorporated herein by reference, a product having a protein efficiency ratio (PER) similar to ground beef (3.0) results. By contrast, some commercial protein isolates supplemented with equivalent amounts of N-acetyl-L-methionine have a lower PER (about 2.5).

The following demonstrates the superior performance and commercial practicality of the present process, as compared with density separation processes which employ ternary (sugar-containing) separation solutions which, although capable of effecting protein separation, undesirably thicken in use.

INDUSTRIAL APPLICABILITY

EXAMPLE II

Recycle Test

| Liquid System | Parts by Weight |
| --- | --- |
| Potassium glycolate | 54.5 |
| Water | 45.5 |

The binary density fractionation liquid of potassium glycolate and water has the density of 1.35 g/ml, a viscosity of 6.7 cp and an $a_w$ of 0.57. Defatted soy flour (500 g) having a particle size of between 20 and 100 microns is mixed with 5000 g of the liquid system and centrifuged for 45 minutes at room temperature and 1000 g. Two semi-solid layers separated by a liquid layer are produced.

The upper, semisolid protein layer is removed by physical separation; the liquid layer is decanted, the viscosity measured. The liquid is then subjected to ultrafiltration to remove solubilized protein and 15% new liquid is added. The density fractionation procedure, above, is again performed recycling the density fractionation liquid.

A similar procedure is followed with a solution of:

| Liquid System | Parts by Weight |
| --- | --- |
| Sucrose | 44 |
| Sodium chloride | 16 |
| Water | 40 | having a viscosity of about 25 cp and an $a_w$ of about 0.67. The filtration step was nearly impossible and no replacement liquid was added. The viscosities of each density fractionation liquid after each fractionation were as follows:

| Recycle# | K glycolate/H2O | Sucrose/NaCl/H2O | Recycle# | K glycolate/H2O |
| --- | --- | --- | --- | --- |
| 1 | 6.7 cp | 72 cp | 9 | 13.1 cp |
| 2 | 7.8 | 187 | 10 | 14.0 |
| 3 | 8.6 | 385 | 11 | 14.1 |
| 4 | 9.4 | 738 | 12 | 14.8 |
| 5 | 10.2 | * | 13 | 15.4 |
| 6 | 10.6 | — | 14 | 15.7 |
| 7 | 10.9 | — | 15 | 16.3 |
| 8 | 11.4 | — | | |

*After the fourth recycle, the sucrose/NaCl/H2O system was too viscous to handle and to achieve meaningful separations.

It is clear that the binary potassium glycolate/water solutions of the present application are superior to ternary sucrose/NaCl/water solutions for processing to recover protein granules. Density fractionation liquids, merely by being in contact with comminuted vegetable material, dissolve and solubilize natural sugars and some protein; these processes increase the viscosity of the liquid. Since the separations become more difficult as the viscosity increases, and since it is presently impracticable to remove the sugars from the liquid so as to reduce the viscosity, the density separation liquid must be eventually discarded or subjected to laborious processes to recover the original components of the density fractionation liquid. Maintaining the density fractionation liquid at as low a viscosity for as long as possible is, therefore, crucial to a commercially practicable process.

EXAMPLE III

Soy Prewash/Recycle Test

The usable lifetime of the binary solutions disclosed herein can be prolonged still further by prewashing the soy meal with an ethanol/water mixture. For example, if the soy meal used in the Recycle Test is prewashed four times with an 80% ethanol/20% water solution at a ratio of 5:1 (w/w) solution to soy, the following viscosity results are obtained:

| Recycle# | Soy Prewashed | Soy Not Prewashed |
| --- | --- | --- |
| 1 | 5.2 cp | 6.7 cp |
| 2 | 5.3 | 7.8 |
| 3 | 5.7 | 8.6 |
| 4 | 6.1 | 9.4 |
| 5 | 6.4 | 10.2 |
| 6 | 6.4 | 10.6 |
| 7 | 6.6 | 10.9 |
| 8 | 6.8 | 11.4 |
| 9 | 7.1 | 13.1 |
| 10 | 6.8 | 14.0 |
| 11 | 6.9 | 14.1 |
| 12 | 7.2 | 14.8 |
| 13 | 7.5 | 15.4 |

It is clear from these test results that the prewashing described significantly extends the useful life of the binary density fractionation liquid.

EXAMPLE IV

| Liquid System | Parts by Weight |
| --- | --- |
| Dipotassium tartrate | 50 |
| Water | 50 |

The binary system of dipotassium tartrate, and water has a density of about 1.40 g/ml and a water activity of about 0.83. Comminuted peanut flour (100 g), produced by freezing peanuts with dry ice and then hammer milling them to a particle size less than about 150 microns, is mixed with the liquid system (1000 g) and centrifuged for about 20 minutes at 30° C. Two solid layers separated by a liquid layer are produced.

The upper, protein granule containing layer is separated, defatted, and washed with an alcohol/water solution containing about 50 parts alcohol and 50 parts water. The protein thus isolated is then separated from the water-alcohol solution and air dried at about 60° C. The resulting product is a peanut protein concentrate which is substantially undenatured.

Similar results are achieved when cottonseed flour or sunflower flour are used in place of peanut flour.

Similar separations can also be achieved using potassium acetate, potassium lactate, potassium malate and potassium citrate.

What is claimed is:

1. A process for recovering protein granules from vegetable seed materials, comprising suspending comminuted vegetable seed material in an aqueous solution of a toxicologically-acceptable alkali metal or calcium or magnesium salt of an organic carboxylic acid, said solution having a density of from about 1.2 to about 1.45 grams/ml and a water activity of from about 0.40 to about 0.85; and isolating the protein granules from the balance of the vegetable seed materials.

2. A process according to claim 1 wherein said vegetable seed materials are oleaginous seeds selected from the group consisting of soybeans, cottonseed, sunflower seed, peanuts, copra, and rapeseed.

3. A process according to claim 2 wherein said oleaginous seed material has a lipid content of from about 0% to about 5%.

4. A process according to claim 3 wherein said oleaginous seed material is soybean meal, flour or concentrate.

5. A process according to claim 1 wherein said organic carboxylic acid is selected from the group consisting of potassium glycolate, potassium citrate, potassium lactate, potassium malate, and dipotassium tartrate.

6. A process according to claim 1 wherein said aqueous solution has a density of from about 1.30 to about 1.40 grams/ml.

7. A process according to claim 6 wherein the water activity is from about 0.55 to about 0.8.

8. A process according to claim 7 wherein the viscosity of said solution is from about 1 to about 300 centipoise.

9. A process according to claim 4 wherein the comminuted oleaginous seed material has an average particle size of from about 20 microns to about 150 microns.

10. A process according to claim 2 wherein said vegetable seed material contains from about 5% to about 70% lipid, and comprising the additional step of defatting the isolated protein granules.

11. A process according to claims 3 or 7, and comprising the additional step of extracting the isolated protein granules with an alcohol/water mixture containing from about 50 parts to about 90 parts of alcohol by weight and from about 50 parts to about 10 parts of water by weight to extract residual nonproteinaceous components from the protein granules.

12. A process according to claim 11 wherein said alcohol is ethanol.

13. A process for recovering protein granules from vegetable seed materials comprising:
    (1) prewashing comminuted vegetable seed material with an alcohol/water mixture containing from about 50 to about 90 parts of alcohol by weight, and from about 50 to about 10 parts of water by weight to reduce the level of natural sugars in said seed material;
    (2) separating the seed material from the alcohol/water mixture;
    (3) suspending the seed material recovered from step (2) in an aqueous solution of a toxicologically-acceptable alkali metal salt of an organic carboxylic acid, said solution having a density of from about 1.20 to about 1.45 gm/ml and a water activity of from about 0.4 to about 0.85; and
    (4) isolating the protein granules from the balance of the seed materials.

14. A process according to claim 13 wherein the seed material is substantially defatted.

* * * * *